US007853137B2

(12) United States Patent
Yang

(10) Patent No.: US 7,853,137 B2
(45) Date of Patent: Dec. 14, 2010

(54) FIXING STRUCTURE FOR AN AUXILIARY LENS OF CAMERAS

(75) Inventor: Chih-Yi Yang, Taipei (TW)

(73) Assignee: Lumos Technology Co., Ltd., Taipei (TW)

( * ) Notice: Subject to any disclaimer, the term of this patent is extended or adjusted under 35 U.S.C. 154(b) by 344 days.

(21) Appl. No.: 12/200,173

(22) Filed: Aug. 28, 2008

(65) Prior Publication Data

US 2009/0110381 A1 Apr. 30, 2009

(30) Foreign Application Priority Data

Oct. 30, 2007 (TW) .............................. 96218219 U

(51) Int. Cl.
G03B 17/00 (2006.01)
G03B 11/00 (2006.01)
G02B 7/02 (2006.01)
H04N 5/225 (2006.01)

(52) U.S. Cl. .................. 396/71; 396/531; 396/544; 359/828; 348/375

(58) Field of Classification Search .................. 396/71, 396/529–533, 544; 359/819, 827–830; 348/375
See application file for complete search history.

(56) References Cited

U.S. PATENT DOCUMENTS 4,596,454 A * 6/1986 Kawai et al. ................. 396/532
5,406,418 A * 4/1995 Deary ........................ 359/827
RE35,679 E * 12/1997 Tanaka ....................... 359/694
2002/0154419 A1* 10/2002 Shoji et al. .................. 359/819
2004/0076424 A1* 4/2004 Terada et al. ................ 396/529

* cited by examiner

Primary Examiner—Rochelle-Ann J Blackman
(74) Attorney, Agent, or Firm—Chun-Ming Shih; HDLS IPR Services

(57) ABSTRACT

A means for fixing an auxiliary lens to the outside of the original lens of a camera body includes an annular base, an annular lens mount and an annular abutting base. The inner edge of the base protrudes upwardly to form a wall. The wall protrudes outwards to form a plurality of blocks. The inner edge of the lens mount is provided with a plurality of notches corresponding to the blocks. A first end surface of the abutting base extends to form a plurality of L-shaped elastic arms corresponding to the blocks and notches. The L-shaped elastic arm extends obliquely from the first end surface toward the lens mount. A gap is formed between the L-shaped elastic arm and the abutting base, so that the L-shaped elastic arm can be bent inwardly when compressed. When the camera body is combined with the auxiliary lens by rotation, the blocks pass through the notches to abut and compress the L-shaped elastic arms. At the same time, the L-shaped elastic arms generate a reaction force, thereby enhancing the tightness between the camera body and the auxiliary lens.

12 Claims, 6 Drawing Sheets

FIXING STRUCTURE FOR AN AUXILIARY LENS OF CAMERAS

BACKGROUND OF THE INVENTION

1. Field of the Invention

The present invention relates to a camera, and in particular to an auxiliary lens for a compact camera.

2. Description of Prior Art

Since the camera has been invented, people like to use it to take a picture. Especially, when people are traveling, they always carry a camera with them. After a digital camera has been developed, it has been widely used because it features instant viewability and erasability.

Like the traditional film cameras, the digital cameras can be classified into two categories, i.e. Single Lens Reflex cameras (SLR) and cameras. Since the compact cameras are highly portable, cheap in price and user-friendly, they are the mainstream in the market.

However, the focal length of a fixed (un-interchangeable) lens equipped in a compact camera is approximately in the range of 35 to 105 mm, which is equivalent to the focal length of a 35 mm-type film camera. The minimum focus distance is more than 50 cm, so that such a compact camera cannot provide a function of close-up photography or a macro-photography. Therefore, if a user needs a close-up photography or a macro-photography, he/she has to use a bulky-and-expensive SLR camera or attach an auxiliary lens with the desired specification to the front of original lens of the compact digital camera. However, even though a high-quality lens is selected, it can only operate well when being connected to the camera properly. Therefore, in addition to the quality of the auxiliary lens and the camera, it is also an important issue to connect this auxiliary lens and the camera firmly and accurately.

The conventional structure for fixing an auxiliary lens onto a compact camera has a base fixed to the outer periphery of the lens of the camera body and a lens mount fixed to the auxiliary lens. A plurality of blocks on the base passes through notches on the lens mount corresponding to the blocks, and then these blocks and notches are combined with each other by rotation. An abutting base fixed between the auxiliary lens and the lens mount exerts a force to the blocks on the base in a direction toward the camera body, thereby tightly clamping the blocks between the lens mount and the abutting base. In this way, the tightness between the camera body and the auxiliary lens is enhanced. Although one end surface of the conventional abutting base is provided with a plurality of springs adjacent to the lens mount, and the top ends of these springs are each provided with an elongate pillar oriented horizontally with respect to the one end surface. The pillars are much closer to the lens mount than the one end surface. Therefore, when the base is combined with the lens mount by rotation, the blocks on the base will pass through the notches on the lens mount to touch the pillars on the abutting base. As a result, the pillars and the springs are compressed in a direction toward the auxiliary lens. After being compressed, the spring generates a reaction force toward the camera body, thereby tightly clamping the blocks between the lens mount and the abutting base. Therefore, the tightness between the camera body and the auxiliary lens can be enhanced.

However, since the spring is formed with a plurality of windings in a coil, its volume cannot be reduced easily and thus it is not suitable for a compact camera. After being used for a long time, the spring may suffer elastic fatigue, so that the damaged elements should be replaced frequently. Since the cost of replacing metallic elements is larger, it becomes an additional burden for the user. Alternatively, another conventional fixing means has a base fixed to the outside of the lens of the camera body and an auxiliary lens via the engagement between the corresponding inner and outer threads. However, the degree of connection of such a fixing means substantially depends on the depth of threads on the base and the auxiliary lens. The volumes of the base and the auxiliary lens of such a fixing means are usually not small, so that it is not suitable for the compact camera.

In view of the above, the Inventor provides the present invention to overcome the above-mentioned drawbacks based on his researches.

SUMMARY OF THE INVENTION

The present invention is to provide a fixing structure for an auxiliary lens of a camera. An abutting base is provided in the auxiliary lens, whereby the tightness between the camera body and the auxiliary lens can be enhanced when the camera body is combined with the auxiliary lens by rotation. Further, the degree of detaching the auxiliary lens from the camera body will not be affected.

The present invention is to provide a fixing structure for an auxiliary lens of a camera, in which a detachable and simple structure is used to replace the traditional expensive metallic elements, thereby reducing the cost of manufacturing and replacing the elements.

The present invention includes an annular base, an annular lens mount and an annular abutting base. The inner edge of the base protrudes upwardly to form a wall. The wall protrudes outwards to form a plurality of blocks. The inner edge of the lens mount is provided with a plurality of notches corresponding to the blocks. A first end surface of the abutting base extends to form a plurality of L-shaped elastic arms corresponding to the blocks and notches. The L-shaped elastic arm extends obliquely from the first end surface toward the lens mount. A gap is formed between the L-shaped elastic arm and the abutting base, so that the L-shaped elastic arm can be bent inwardly when compressed. When the camera is combined with the auxiliary lens by rotation, the block passes through the notch to abut and compress the L-shaped elastic arm. At the same time, the L-shaped elastic arm generates a reaction force, thereby enhancing the tightness between the camera body and the auxiliary lens.

DETAILED DESCRIPTION OF THE INVENTION

Figure 1:
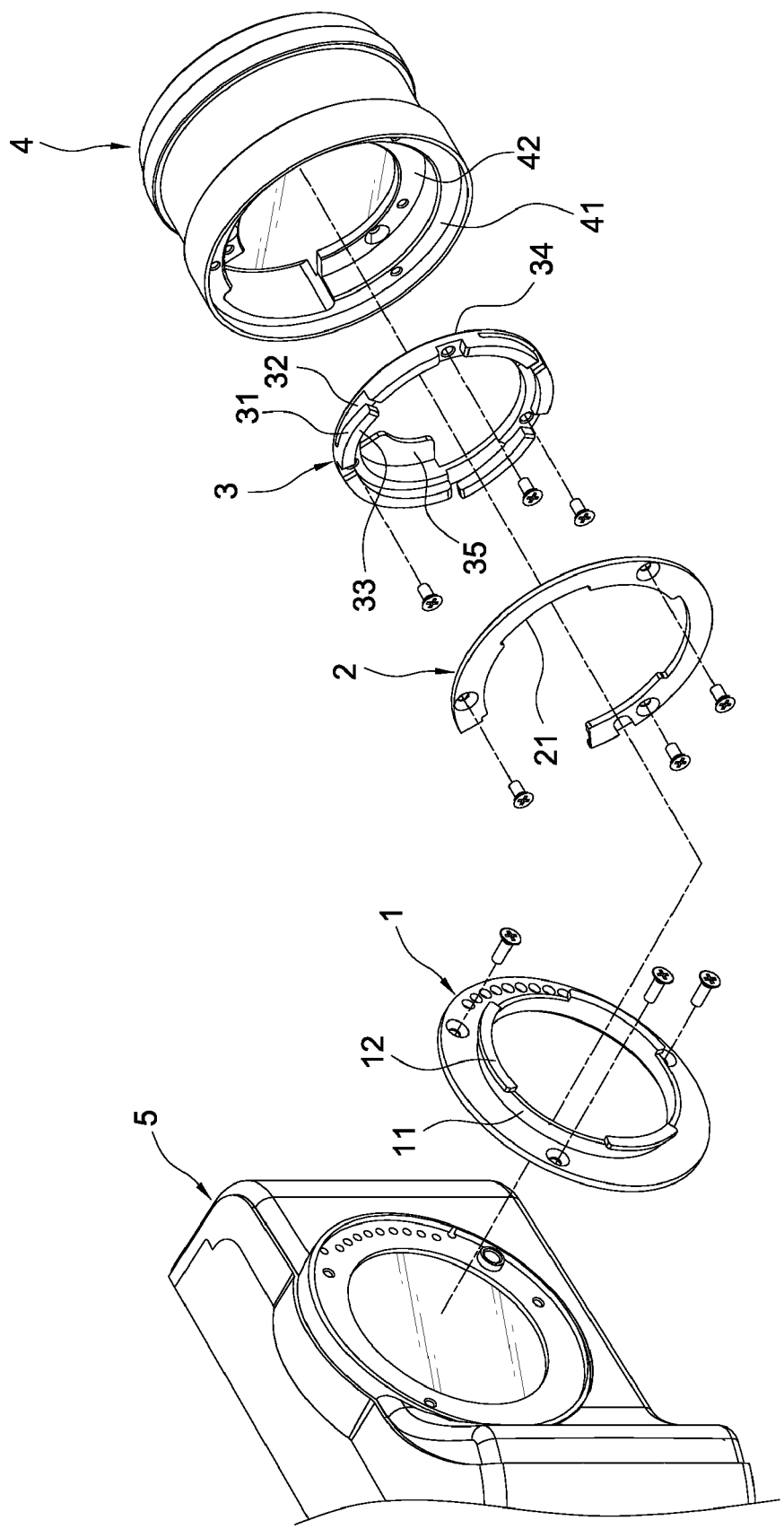
FIG. 1 is an exploded perspective view showing a preferred embodiment of the present invention.

Please refer to FIG. 1, which is an exploded perspective view showing a preferred embodiment of the present invention. The present invention includes a base 1, a lens mount 2 and an abutting base 3. In the present embodiment, the base 1 and the abutting base are annular. The lens mount 2 is a C-shaped ring having an opening as shown in FIG. 1. The lens mount 2 also can be a closed ring. Those skilled in this art will understand that the shape is not limited thereto, but can be changed according to the desired object. The dimension of the base 1 is corresponding to that of the lens of a camera body 5. The inner edge of the base 1 protrudes outwardly to form an annular wall 11. The top end of the annular wall 11 further protrudes outwardly to form a plurality of curved blocks 12. The inner and outer diameters of the lens mount 2 are approximately identical to those of the base 1, while the thickness of the lens mount 2 is approximately identical to the height of the annular wall 11. The inner edge of the lens mount 2 is provided with a plurality of notches 21 that correspond to the blocks 12 on the base 1.

The abutting base 3 has a first end surface 33 and a second end surface 34. The upper edge of the first end surface 33 extends to form a plurality of L-shaped elastic arms 31 corresponding to the blocks 12 and the notches 21. In the present embodiment, the abutting base is made of plastic, but the material is not limited thereto. One end of the L-shapes elastic arm 31 is connected to the upper edge of the abutting base 3, while the other end extends obliquely toward the lens mount 2 without contacting the abutting base 3. A gap 32 is formed between the L-shaped elastic arm 31 and the abutting base 3, thereby serving as an accommodating space. When the L-shaped elastic arm 31 is compressed by an external force, the extending portion of the L-shaped elastic arm 31 can be bent in the gap 32. The second end surface 34 is provided with a positioning portion 35 for engaging with a positioning slot (not shown) within an auxiliary lens 4.

Figure 2:
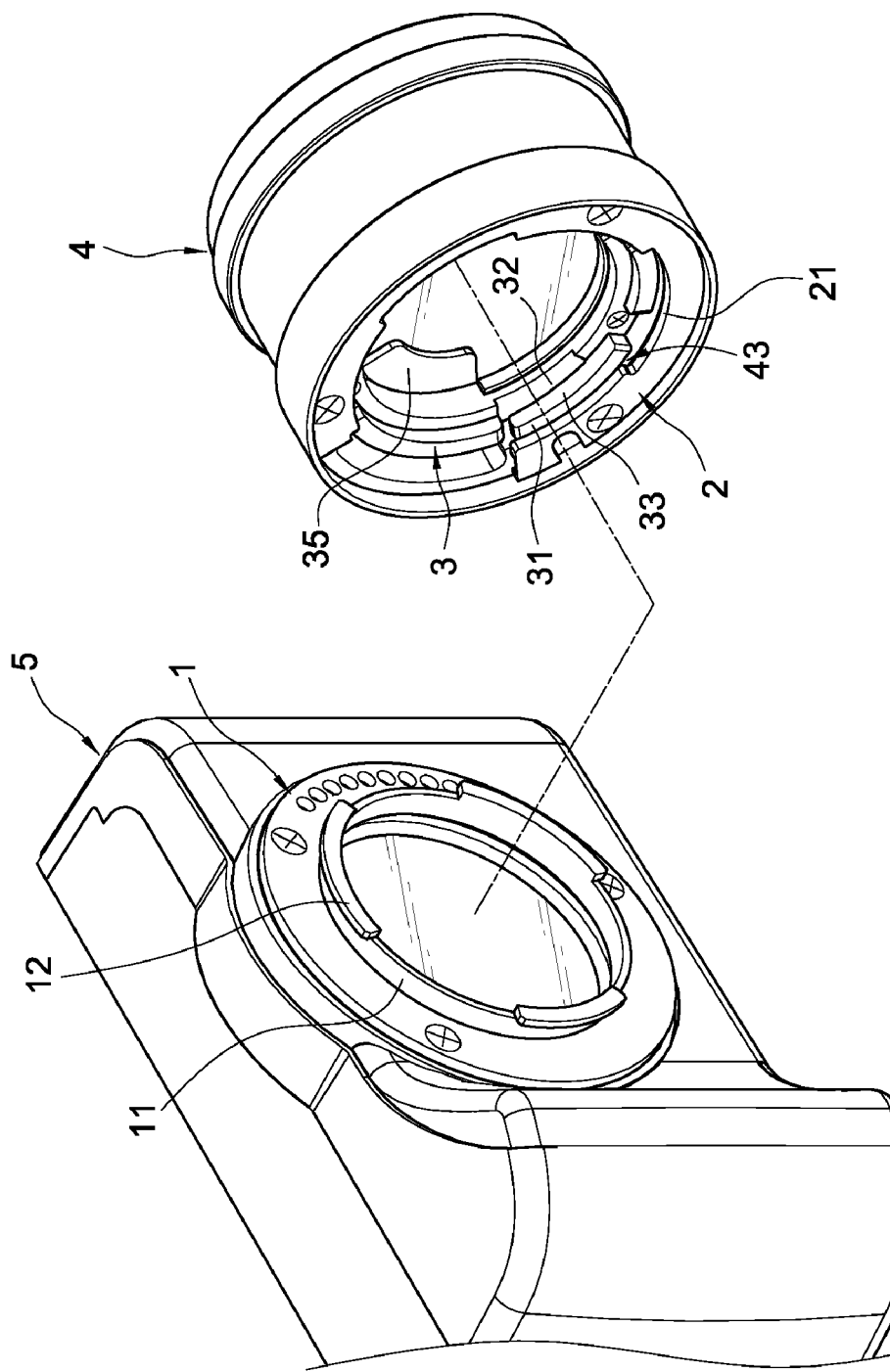
FIG. 2 is a partially exploded view showing a preferred embodiment of the present invention.
Figure 3:
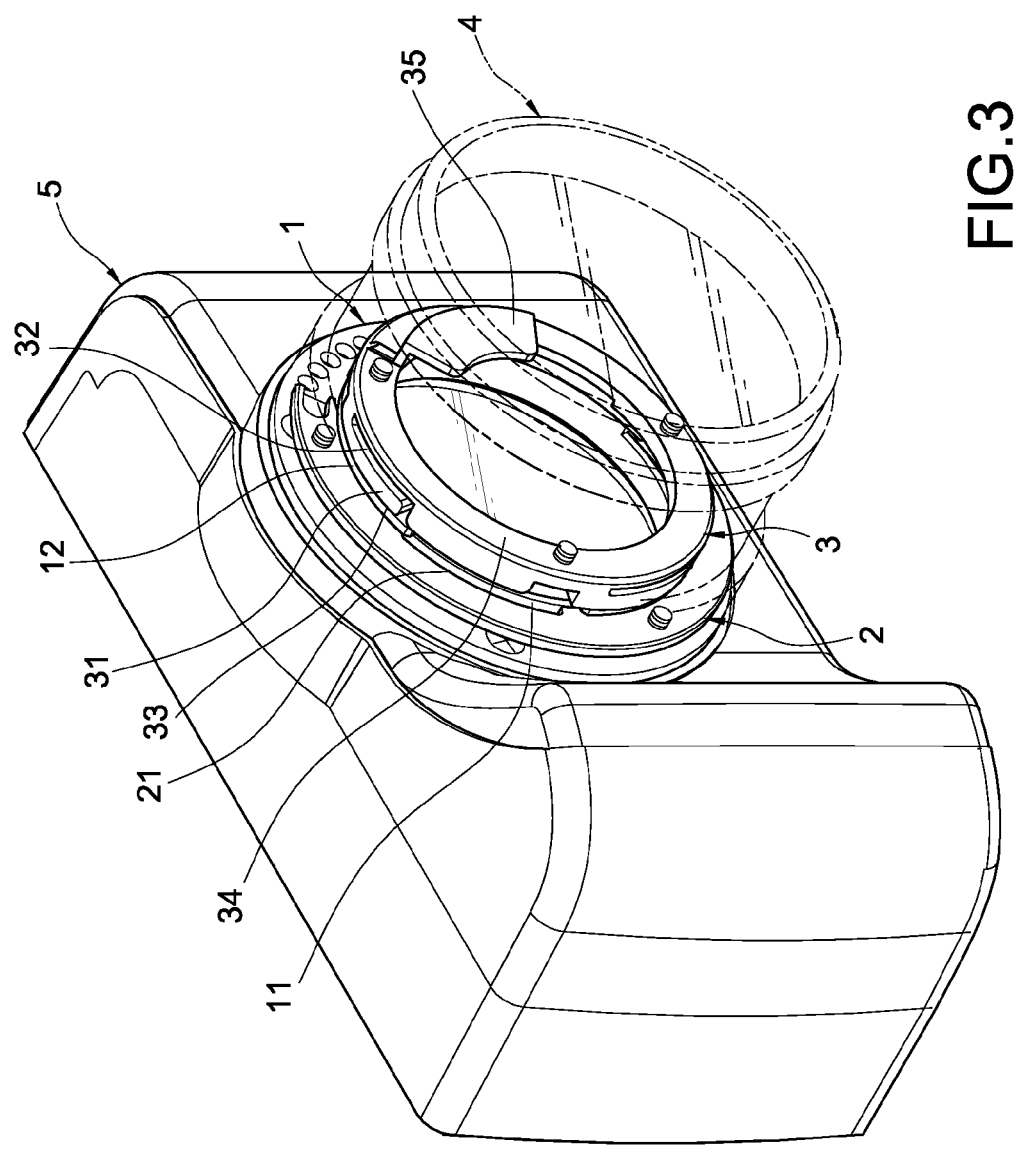
FIG. 3 is an assembled perspective view showing a preferred embodiment of the present invention.

Please refer to FIGS. 2 and 3. FIG. 2 is a partially exploded view of a preferred embodiment of the present invention, and FIG. 3 is an assembled perspective view thereof. As shown in FIG. 2, the base 1 can be detachably fixed to the outside of the lens of the camera body 5, and the way of fixing can be achieved by screws, rivets or other replaceable elements. In the present embodiment, the elements are fixed by screws, but it is not limited thereto. The rear end of the interior of the auxiliary lens 4 has an outer peripheral surface 41 corresponding to the shape of lens base 2. The interior of the auxiliary lens 4 is provided with an inner peripheral surface 42 adjacent to its rear end and corresponding to the shape of the abutting base 3. In this way, the lens mount 2 is detachably fixed to the outer peripheral surface 41 within the auxiliary lens 4. The abutting base 3 is detachably fixed to the inner peripheral surface 42 within the auxiliary lens 4 and is located between the lens mount 2 and the auxiliary lens 4. A space 43 is formed between the abutting base 3 and the lens mount 2. The space 43 is approximately identical to the thickness of the block 12. When the auxiliary lens 4 is disposed in the camera body 5, the notches 21 on the lens mount 2 exactly allow the blocks 12 of the base 1 to pass through the lens mount 2 and contact the surface of the abutting base 3 directly. When the camera body 5 is combined with the auxiliary lens 4 by rotation, the space 43 can accommodate the blocks 12. After finishing the above steps, the assembled state shown in FIG. 3 can be achieved. When an element suffers damage, the user only needs to change the damaged element.

Figure 4:
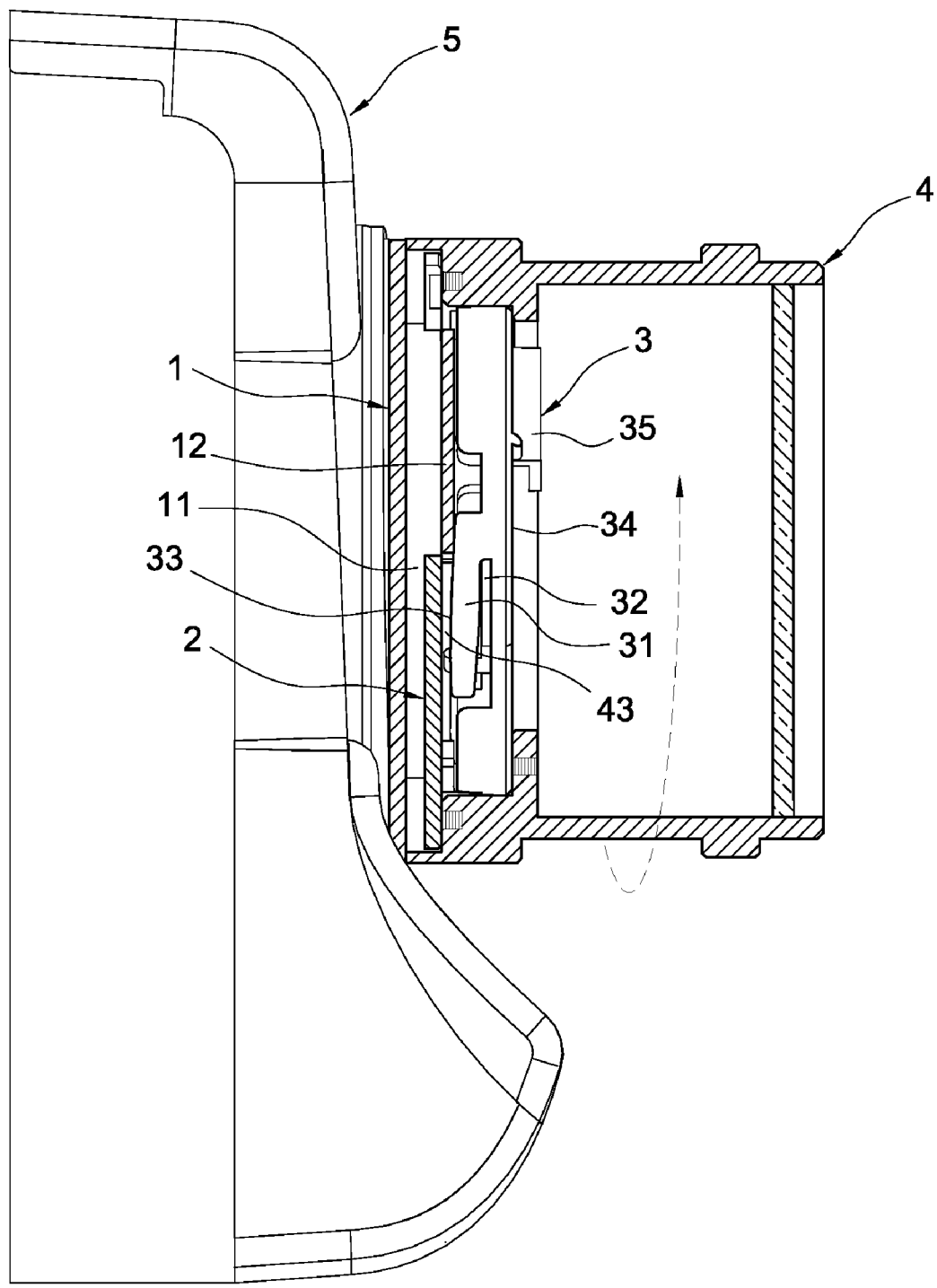
FIG. 4 is a cross-sectional view showing the lens-fixing means of the present invention before connection.
Figure 5:
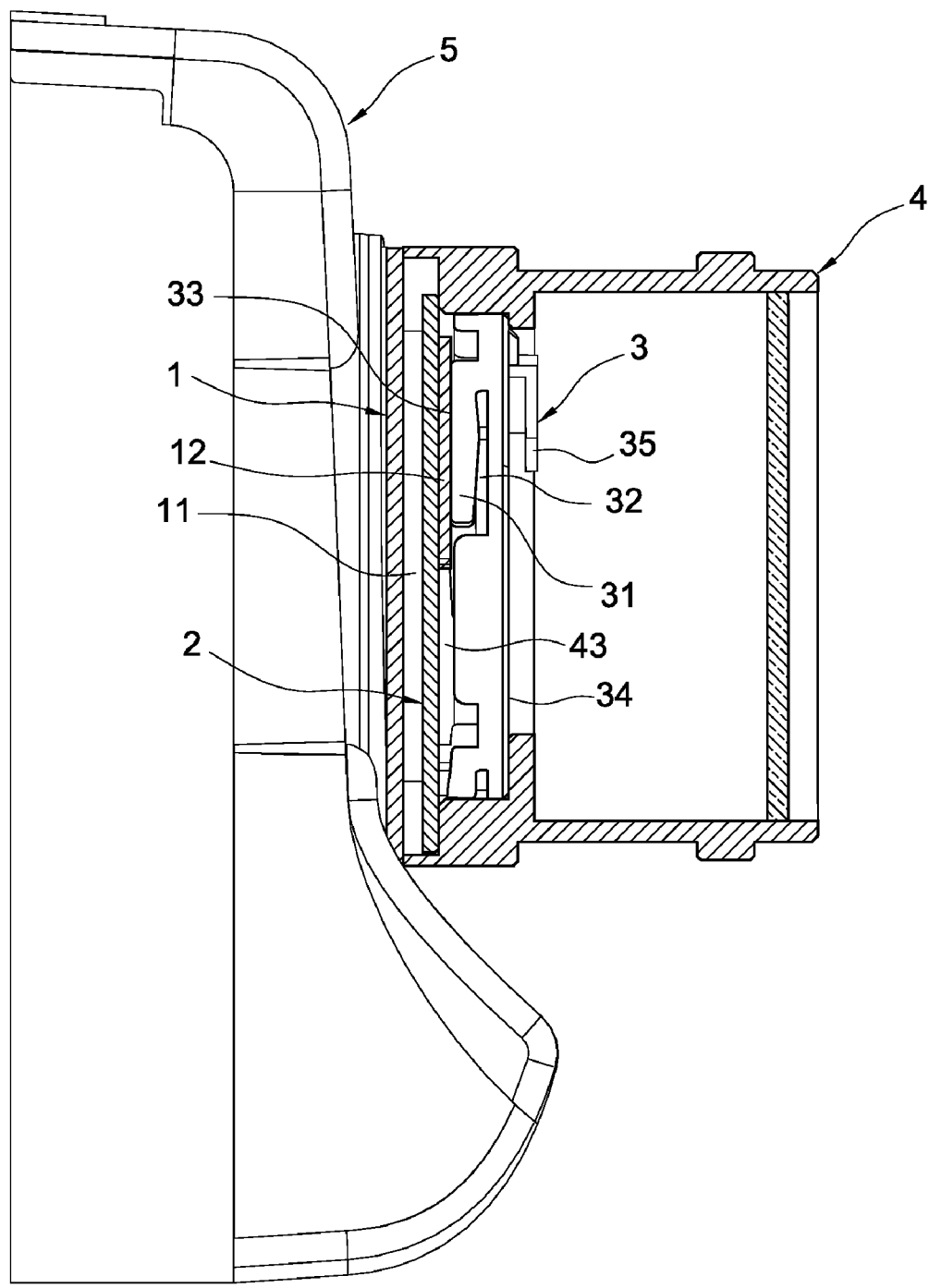
FIG. 5 is a cross-sectional view showing the lens-fixing means of the present invention after connection.

Please refer to FIG. 4, which is a cross-sectional view showing the means for fixing a lens to a camera before connection. As shown in this figure, when the auxiliary lens 4 is disposed in the camera body 5 but not combined with the camera body 5 yet, the blocks 12 pass through the notches 21 to abut the abutting base 3. At this time, due to the positional relationship, the L-shaped elastic arms 31 have not been compressed by the blocks 12 and thus still inclined toward the lens mount 2. Please further refer to FIG. 5, when the auxiliary lens 4 is rotated, one surface of the blocks 12 abuts the lens mount 2, while the other surface compresses the L-shaped elastic arms 31. As a result, the L-shaped elastic arms 31 are bent inwardly and also generate a reaction force to resist the deformation. In this way, the blocks are clamped between the lens mount 2 and the abutting base 3, so that the camera body 5 and the auxiliary lens 4 can be tightly combined with each other without loosening.

Figure 6:
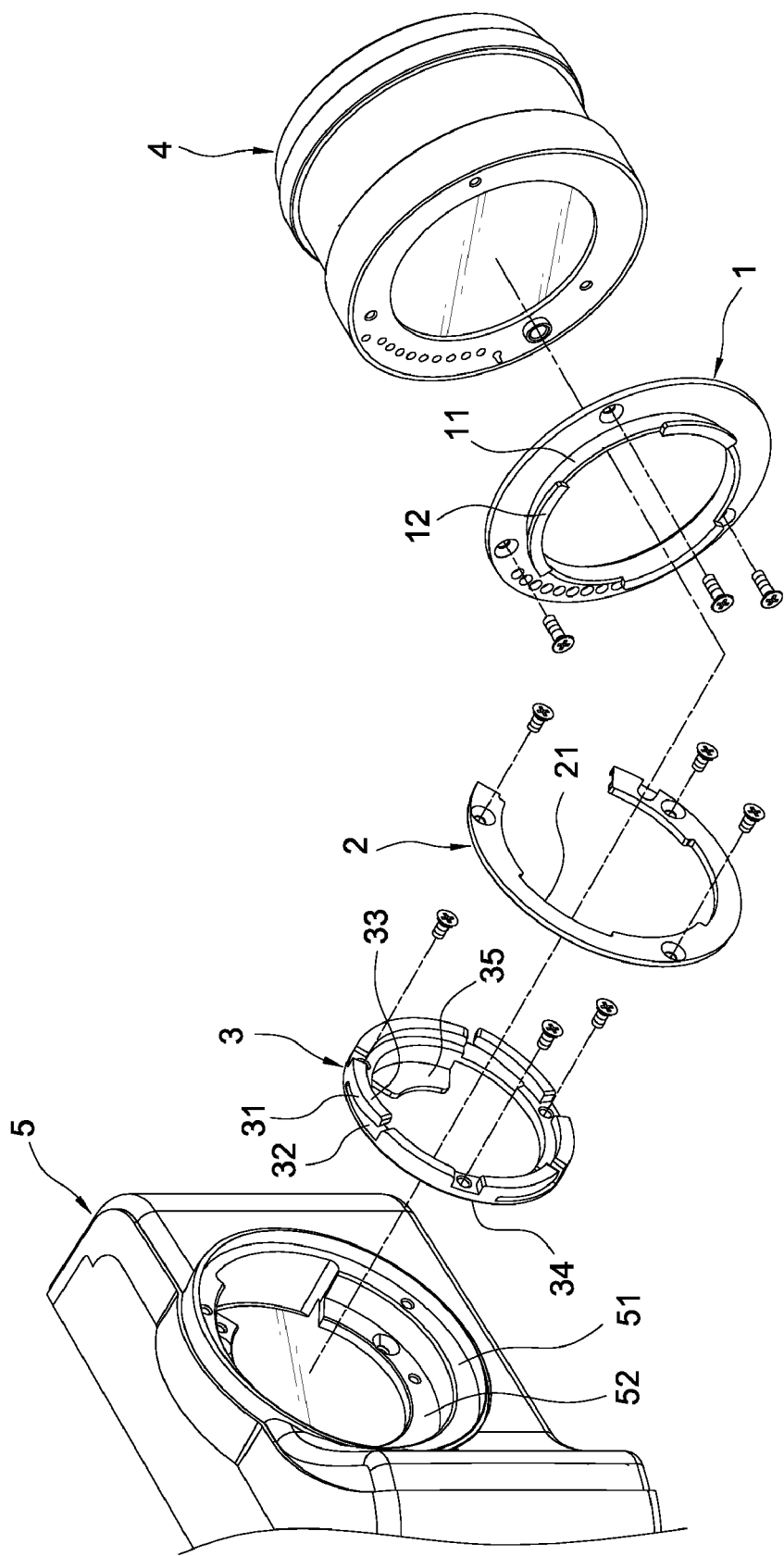
FIG. 6 is an exploded perspective view showing another preferred embodiment of the present invention.

Please refer to FIG. 6, which is another preferred embodiment of the present invention. As shown in this figure, such an embodiment slightly changes the structures of the camera body 5 and the auxiliary lens 4 with each other. That is, the outside of the lens of the camera body 5 is provided with an outer peripheral surface 51 and an inner peripheral surface 52. The lens mount 2 and the abutting base 3 are fixed to the outer peripheral surface 51 and the inner peripheral surface 52 provided outside the lens of the camera body 5 respectively. The rear end of the auxiliary lens 4 is formed into a plane. The base 1 is fixed to the outside of the rear end of the auxiliary lens 4. Such an equivalent change does not substantially affect the structure and usage of the present invention. Those skilled in this art can understand that the present invention is not limited to the above-mentioned structures, but can be suitably modified based on the practical demands.

In the present invention, the L-shaped elastic arms 31 on the abutting base 3 generate a reaction force to resist the deformation, thereby clamping the blocks 12 of the base 1 between the lens mount 2 and the abutting base 3. In this way, the tightness between the camera body 5 and the auxiliary lens 4 is enhanced. The combination and detachment of the camera body 5 and the auxiliary lens 4 can be performed easily even though their structures are rigid. When an element suffers damage to cause the combination of the camera body 5 and the auxiliary lens 4 to be unsteady or even loosened, the user only needs to change the damaged element without replacing the whole set of auxiliary lens. Furthermore, the present embodiment utilizes plastic elements which are cheaper than the metallic spring used in prior art. Therefore, the cost for replacing damaged and expensive elements can be reduced.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A fixing structure for a camera having a camera body and a lens unremovably connected thereon, comprising:

an annular base, one end surface of the base for being fixed to an outer periphery of the lens of the camera body, an inner edge of the other end surface being provided with an annular wall, and the top end of the annular wall protruding outwardly to form at least one block;

an auxiliary lens for being fixed onto the camera body to cover the lens, the interior thereof being provided with an outer peripheral surface at its rear end and an inner peripheral surface adjacent to its rear end;

a C-shaped lens mount having the same inner and outer diameters as those of the base, the lens mount being fixed to the outer peripheral surface within the auxiliary lens, the inner edge of the lens mount being provided with at least one notch, and the shape and number of the notches corresponding to those of the blocks, so that the notches allow the blocks to pass through separately; and an annular abutting base having opposite a first end surface and a second end surface, the first end surface of the abutting base adjacent to the lens mount being provided with at least one L-shaped elastic arm corresponding to the blocks and notches, and the second end surface adjacent to the auxiliary lens being fixed to the inner peripheral surface within the auxiliary lens, wherein the blocks pass through the notches and compress the elastic arms when the blocks are combined with the notches by rotation.

2. The fixing structure according to claim 1, wherein the base is detachably fixed to the outside of the lens of the camera body by screws or rivets.

3. The fixing structure according to claim 1, wherein the lens mount is detachably fixed to the outer peripheral surface within the auxiliary lens by screws or rivets, and the abutting base is detachably fixed to the inner peripheral surface within the auxiliary lens by screws or rivets.

4. The fixing structure according to claim 1, wherein the second end surface of the abutting base adjacent to the auxiliary lens is provided with a positioning portion that is engaged with the auxiliary lens.

5. The fixing structure according to claim 1, wherein the L-shaped elastic arm on the abutting base extends obliquely toward the lens mount.

6. The fixing structure according to claim 1, wherein the number of the blocks on the wall of the base, the notches on the lens mount and the L-shaped elastic arms on the abutting base is three or more.

7. A fixing structure for a camera having a camera body and a lens unremovably connected thereon, comprising:
   a camera having a camera body and a lens unremovably connected therein, the camera body, and provided with an outer peripheral surface and an inner peripheral surface outside the lens;
   an annular base, one end surface of the base for being fixed to a rear end of an auxiliary lens, an inner edge of the other end surface being provided with an annular wall, and the top end of the annular wall protruding outwardly to form at least one block;
   a C-shaped lens mount having the same inner and outer diameters as those of the base, the lens mount being fixed to the outer peripheral surface outside the lens of the camera body, the inner edge of the lens mount being provided with at least one notch, and the shape and number of the notches corresponding to those of the blocks, so that the notches allow the blocks to pass through separately; and
   an annular abutting base having opposite a first end surface and a second end surface, the first end surface of the abutting base adjacent to the lens mount being provided with at least one L-shaped elastic arm corresponding to the blocks and notches, and the second end surface adjacent to the camera body being fixed to the inner peripheral surface outside the lens of the camera body, wherein the blocks pass through the notches and compress the elastic arms when the blocks are combined with the notches by rotation.

8. The fixing structure according to claim 7, wherein the base is detachably fixed to the rear end of the auxiliary lens by screws or rivets.

9. The fixing structure according to claim 7, wherein the lens mount is detachably fixed to the outer peripheral surface outside the lens of the camera body by screws or rivets, and the abutting base is detachably fixed to the inner peripheral surface outside the lens of the camera body via screws or rivets.

10. The fixing structure according to claim 7, wherein the second end surface of the abutting base adjacent to the camera body is provided with a positioning portion that is engaged with the camera body.

11. The fixing structure according to claim 7, wherein the L-shaped elastic arm on the abutting base extends obliquely toward the lens mount.

12. The fixing structure according to claim 7, wherein the number of the blocks on the wall of the base, the notches on the lens mount and the L-shaped elastic arms on the abutting base is three or more.

\* \* \* \* \*